United States Patent
Schulze et al.

(10) Patent No.: US 6,878,178 B2
(45) Date of Patent: Apr. 12, 2005

(54) DEVICE FOR GUIDING AWAY WATER, DUST AND THE LIKE

(75) Inventors: Heinz Schulze, Leinfelden-Echterdingen (DE); Eberhard Storz, Kirchheim (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 85 days.

(21) Appl. No.: 10/350,102

(22) Filed: Jan. 24, 2003

(65) Prior Publication Data

US 2003/0154862 A1 Aug. 21, 2003

(30) Foreign Application Priority Data

Jan. 24, 2002 (DE) .......................... 102 02 533

(51) Int. Cl.[7] ................ B01D 46/00; B01D 46/48
(52) U.S. Cl. ................ 55/385.3; 55/428; 55/431; 55/466; 55/467; 55/503; 55/DIG. 28
(58) Field of Search .................. 55/385.3, 428, 55/430, 431, 466, 467, 503, DIG. 28; 95/273, 279

(56) References Cited

U.S. PATENT DOCUMENTS

| | | | | |
|---|---|---|---|---|
| 3,202,076 A | * | 8/1965 | Fieni .......................... 454/163 |
| 3,436,900 A | * | 4/1969 | Evens et al. ................ 55/385.3 |
| 3,838,675 A | * | 10/1974 | Schaeffer ..................... 55/430 |
| 4,204,848 A | * | 5/1980 | Schulmeister et al. ........ 55/473 |
| RE30,409 E | * | 9/1980 | Borsheim ..................... 55/430 |
| 4,249,922 A | * | 2/1981 | Saele .......................... 55/431 |
| 4,469,490 A | * | 9/1984 | Wilson ...................... 55/385.3 |
| 5,427,502 A | * | 6/1995 | Hudson ..................... 55/385.3 |
| 6,290,738 B1 | * | 9/2001 | Holm .......................... 55/466 |
| 6,588,524 B2 | * | 7/2003 | Keen et al. ............. 123/198 E |
| 2002/0189214 A1 | * | 12/2002 | Hettmann et al. ......... 55/385.3 |
| 2003/0084652 A1 | * | 5/2003 | Freytag et al. ............ 55/385.3 |
| 2003/0182910 A1 | * | 10/2003 | Pikesh et al. .............. 55/385.3 |

FOREIGN PATENT DOCUMENTS

DE 41 09 406 C1 4/1992

* cited by examiner

Primary Examiner—Duane Smith
Assistant Examiner—Jason M. Greene
(74) Attorney, Agent, or Firm—Crowell & Moring LLP

(57) ABSTRACT

A connecting line is provided for removing water entering an air filter housing, between the air filter housing and a cooling unit. Due to the existing difference in pressure between the air filter housing and the cooling unit, water can be suctioned out of the air filter housing via the connecting line.

3 Claims, 1 Drawing Sheet

DEVICE FOR GUIDING AWAY WATER, DUST AND THE LIKE

BACKGROUND OF THE INVENTION

The present invention relates to a device for removing water, dust and the like and, more particularly, to a device which comprises a cooling unit with an air fan wheel and a heat exchanger and wherein the air filter housing contains an air filter between an untreated-air housing and a clean-air housing.

DE 41 09 406 C1 discloses an air filter device for an internal combustion engine with a dust precipitator in an intake line of a charged internal combustion engine. From the dust precipitator extends a dust exhaust-air line, which joins into a blower hood between a water-air heat exchanger and an engine ventilation device.

SUMMARY OF THE INVENTION

An object of the present invention is to provide an improved device for removing water, dust and the like from an air filter housing in a simple manner.

This task has been achieved according to the present by providing a connecting line between the air filter housing and a ventilation casing of the air fan wheel, which is connected between a water-absorbing chamber of the air filter housing and a chamber enclosed by the ventilation casing.

Among the main advantages accomplished with the present invention is the that, through a so-called vacuum line between air filter housing and ventilation architrave, water that may possibly be contained in the air filter housing can be removed through suction. For this purpose, between the air filter housing and the ventilation architrave of the air fan wheel, a connecting line is provided. On one hand, the connecting line is connected with a water-absorbing chamber of the air filter housing and, on the other hand, with a chamber that is enclosed by the ventilation architrave. This connecting line between the water-absorbing chamber in the air filter housing and the surrounding chamber in the ventilation architrave creates a simple possibility of removing water continuously from the air filter housing so that it cannot enter the air filter and so that it cannot be carried along by the combustion air and/or enter the air filter in the first place.

To be able to suction water or even dust particles out of the air filter housing during operation of the internal combustion engine, the existing vacuum in the cooling unit is utilized, in particular a difference in pressure exists between the ventilation architrave and the air filter housing so that the water can be suctioned off via the connecting line into the ventilation architrave and can be removed to the outside. The water or the dust particles can thus be removed through suction via the line without particular auxiliary devices so that the air filter and clean air are free from water.

The connecting line is connected at least with the untreated air housing of the air filter housing and enters the chamber encased by the ventilation architrave. This means that the connecting line can be connected with one or more chambers of the air filter housing in the case of an air filter that comprises an untreated air housing and a clean air housing and that is arranged between these housings so that if water enters, as is the case for example when driving through water with water entering the air filter housing, it can be removed immediately.

BRIEF DESCRIPTION OF THE DRAWINGS

These and other objects, features and advantages of the present invention will become more readily apparent from the following detailed description of currently preferred configurations thereof when taken in conjunction with the accompanying drawings wherein.

DETAILED DESCRIPTION OF THE DRAWINGS

Figure 1:
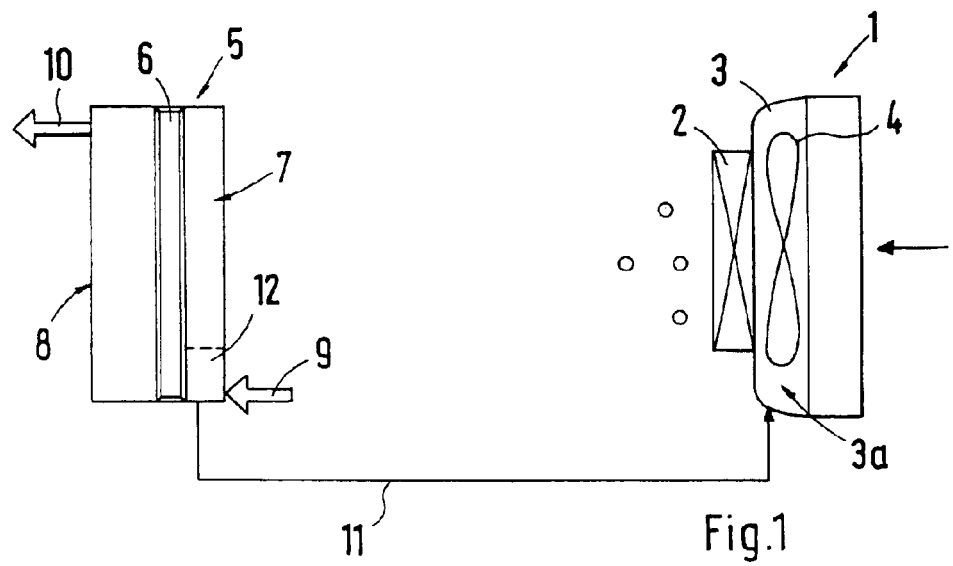
FIG. 1 is a schematic drawing of an air filter housing and a cooling unit with a connecting line in accordance with the present invention.
Figure 2:
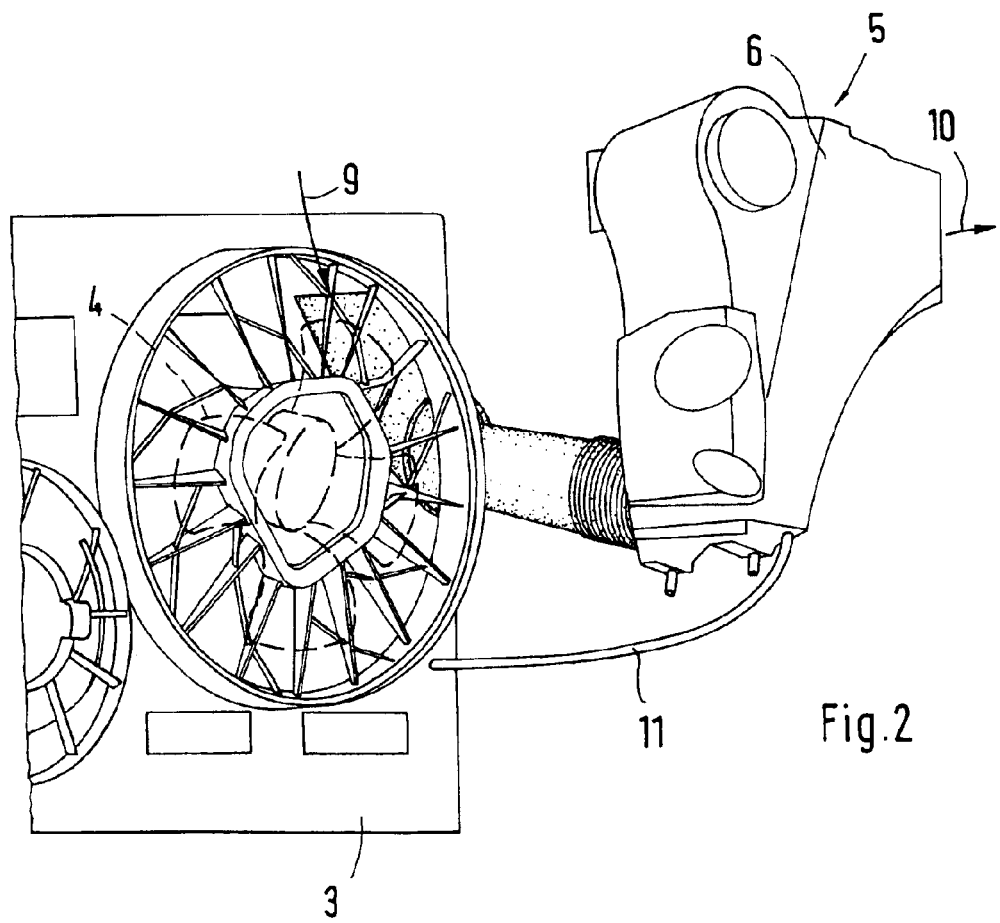
FIG. 2 is a perspective view of the air filter housing and the cooling unit with the connecting line, configured as a vacuum line, between the air filter housing and the cooling unit in accordance with the present invention.

In a motor vehicle, a cooling unit 1 for an internal combustion engine is typically arranged in the front. The unit has a heat exchanger 2 with a fan wheel 4 that is arranged in a ventilation architrave or casing 3. Also on the front of the vehicle, a housing 5 for an air filter 6 is provided. The filter 6 is seated between an untreated-air housing 7 and a clean-air housing 8 of the air filter housing 5. Via this clean-air housing 8, air 9 is taken in via the untreated air housing 7 and is fed to the internal combustion engine as combustion air 10 after penetrating the air filter 6.

As shown in more detail in FIG. 1, a connecting line 11 is provided between the air filter housing 5 and the cooling unit 1. In particular, this line 11 is connected directly with the untreated air housing 7 and joins into an intermediate chamber surrounded by the ventilation casing or architrave 3 between the cooling unit 2 and the cooling fan 4.

Because a vacuum exists in this intermediate space during operation of the internal combustion engine, e.g. of 0.25 bar, water 12 collected in the untreated air housing 7 can be suctioned off via the line 11 and be removed to the outside. Similarly dust and other contamination can be removed to the outside in the same way.

Water entering the air filter housing 5 is especially possible when driving through water or during heavy rain. With a running engine, a vacuum exists in the air filter housing 5. Thus, the water cannot otherwise leave immediately. Due to a difference in pressure between the ventilation architrave or casing 3 and the air filter housing 5, the water or dust and the like can be transported between the cooling unit 2 and the cooling fan 4. From there, the water or the dust is transported into the engine compartment by the existing air flow and from there to the outside. In this way, an air filter that is free from water is achieved, and no water can enter through water outlet bores.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

We claim:

1. Device for removing water, dust and other unwanted things from an air filter housing of a motor vehicle internal combustion engine, comprising a cooling unit with an air fan wheel and a heat exchanger, the air filter housing containing an air filter between an untreated-air housing and a clean-air housing, wherein a connecting line is provided between the air filter housing and a ventilation casing of the air fan wheel which is connected between a water-absorbing chamber of the air filter housing and a chamber enclosed by the ventilation casing and the connecting line is operatively connected at least with a clean-air housing of the air filter housing and enters the chamber enclosed by the ventilation casing.

2. The device according to claim 1, wherein a pressure differential is established between the ventilation casing and the air filter housing so that water can be suctioned into the ventilation casing via the connecting line and removed to the outside.

3. The device according to claim 2, wherein, in the chamber between the heat exchanger and the air fan wheel, water or dust can be removed to the outside via an engine compartment.

* * * * *